United States Patent [19]

de Geus et al.

[11] Patent Number: 5,372,723
[45] Date of Patent: Dec. 13, 1994

[54] PROCESS FOR REPROCESSING OIL-IN-WATER EMULSIONS

[75] Inventors: Johannes de Geus, Leverkusen; Rolf Kehlenbach, Bergisch Gladbach; Bernhard Lehmann, Aachen, all of Germany

[73] Assignee: Bayer Aktiengesellschaft, Leverkusen, Germany

[21] Appl. No.: 81,538

[22] Filed: Jun. 23, 1993

[30] Foreign Application Priority Data

Jul. 3, 1992 [DE] Germany ............... 4221936

[51] Int. Cl.⁵ ............... B01D 15/00; B01D 61/00; B01D 17/02
[52] U.S. Cl. ............... 210/639; 210/650; 210/651; 210/652; 210/799
[58] Field of Search ............... 210/639, 651, 652, 650, 210/799, 637, 195.2, 654; 252/328.8

[56] References Cited

U.S. PATENT DOCUMENTS

| | | | |
|---|---|---|---|
| 4,609,488 | 9/1986 | Geke et al. | 210/708 |
| 4,655,927 | 4/1987 | Ford | 210/639 |
| 4,738,781 | 4/1988 | Word et al. | 210/637 |
| 4,865,742 | 9/1989 | Falletti | 210/651 |
| 4,872,991 | 10/1989 | Bartels et al. | 210/799 |
| 4,968,449 | 11/1990 | Stephenson | 252/358 |
| 5,039,450 | 8/1991 | Kupfer et al. | 252/331 |
| 5,196,486 | 3/1993 | Stephenson | 252/358 |
| 5,227,071 | 7/1993 | Torline et al. | 210/651 |

FOREIGN PATENT DOCUMENTS

| | | | |
|---|---|---|---|
| 0333141 | 9/1989 | European Pat. Off. | |
| 2528990 | 1/1977 | Germany . | |
| 3002111 | 7/1981 | Germany . | |
| 3247431 | 6/1984 | Germany . | |
| 3831976 | 3/1990 | Germany . | |
| 4040022 | 6/1992 | Germany . | |
| 0042504 | 4/1977 | Japan | 210/652 |
| 7760 | 1/1979 | Japan | 210/639 |

*Primary Examiner*—Robert A. Dawson
*Assistant Examiner*—Ana M. Fortuna
*Attorney, Agent, or Firm*—Sprung Horn Kramer & Woods

[57] ABSTRACT

Oil-in-water emulsions are reprocessed in a particularly effective manner by a process in which
  a) an oil-in-water emulsion is first subjected with the aid of a chemical emulsion breaker to a first breaking and
  b) the resulting water phase is fed to a micro-, nano- and/or ultrafiltration or a reverse osmosis,
which is characterised in that
  c) the oil phase from stage a) is combined with the oil phase from stage b) and
  d) the oil phases thus combined are subjected with the aid of organic emulsion breakers to a second breaking.

6 Claims, No Drawings

PROCESS FOR REPROCESSING OIL-IN-WATER EMULSIONS

The present invention relates to a particularly advantageous process for reprocessing oil-in-water emulsions in which a highly reusable or disposable water phase and a highly reusable or disposable oil phase are obtained.

Oil-in-water emulsions which must be disposed of are produced on many occasions. Thus, large amounts of oil-containing waste waters are produced, for example, in mechanical fabrication during pretreatment, processing and cleaning of production-line components. These waste waters, which, for example, in addition to oily lubricants and cooling lubricants can also contain degreasing bath and cleaner constituents contaminated by oil entry, must be reprocessed in such a manner that a waste water is produced which can be introduced into the sewage system or an outfall in compliance with the regulations and an oil phase which can be fed to an economical and environmentally friendly utilisation.

The processes known hitherto for reprocessing oil-containing waste waters only incompletely satisfy these requirements.

German Offenlegungsschrift 3 831 976 describes a process according to which an oil-in-water emulsion is first broken using an organic emulsion breaker, the resulting water phase is subjected to micro- and/or ultrafiltration and the resulting retentate (=oil phase) is returned to the oil-in-water emulsion to be broken. A water phase (after the micro- and/or ultrafiltration) and an oil phase (after breaking with the organic emulsion breaker) are obtained in this case each of which still contain relatively large amounts of the respective other phase. They are therefore neither highly reusable nor disposable.

A process has now been found for reprocessing oil-in-water emulsions in which a) an oil-in-water emulsion is first subjected with the aid of a chemical emulsion breaker to a first breaking and b) the resulting water phase is fed to a micro-, nano- and/or and/or ultrafiltration or a reverse osmosis, which is characterised in that, c) the oil phase from the first breaking is combined with the oil phase from the micro-, nano- and/or ultrafiltration or the reverse osmosis and d) the oil phases thus combined are subjected with the aid of organic emulsion breakers to a second breaking.

In stage a) of the process according to the invention, the chemical emulsion breakers which can be used are, for example, water-soluble polymers, cationic polymers being generally preferred to anionic and nonionic polymers. Those which are useful are, for example, synthetic polymers based on acrylamide, pure polyacrylamide being nonionic, copolymers of acrylamide and acrylate being anionic and copolymers of acrylamide and cationic monomers or oligomers being cationic, in addition, synthetic polymers based on polyamines and polyamideamines, quaternised polyamines and quaternised polyamideamines, in addition, homopolymers of dimethyldiallylammonium chloride, also termed DADMAC, and also inorganic emulsion breakers, such as inorganic metal salts, for example of magnesium, sodium, calcium, iron, silicon, aluminium and cerium, each of which can be used in the form of hydroxides, oxides, chlorides or sulphates. Divalent and trivalent salts are preferred here.

The water phase produced in stage a) of the process according to the invention generally contains residual hydrocarbons in amounts of less than 100 mg/l.

In stage b) of the process according to the invention, a microfiltration, a nanofiltration or an ultrafiltration or a combination of these processes or a reverse osmosis is carried out. Organic or inorganic membranes can be used in this case. Inorganic membranes are generally completely insensitive to emulsion breakers, which are contained in the water phases used in stage b) of the process according to the invention. In the case of organic membranes, it is advantageous if emulsion breakers having high molecular weights are used and if the material used does not contain any free cationic surfactants.

Stages a) and b) are known in principle per se.

Stages c) and d) are essential to the invention, that is the combination of the oil phase from stage a) and the oil phase (=retentate) from the micro-, nano- and/or ultrafiltration or reverse osmosis and the breaking of the phases thus combined using an organic emulsion breaker.

Stage d) is advantageously carried out in the form of a so-called hybrid breakdown, that is with the addition of two different emulsion breakers.

Synthetic polymers based on acrylamide are useful as the first component for so-called hybrid emulsion breakers, pure polyacrylamide being nonionic, copolymers of acrylamide and acrylate being anionic and copolymers of acrylamide and cationic monomers or oligomers being cationic, in addition are synthetic polymers based on polyamines and polyamideamines, and quaternised polyamines and quaternised polyamideamines and homopolymers of dimethyldiallylammonium chloride, which are also termed DADMAC.

Suitable as the second component for so-called hybrid emulsion breakers are polymers and/or oligomers of ethylene oxide and/or 1,2-propylene oxide, alkoxylated phenol resins, block or random copolymers of ethylene oxide and 1,2-propylene oxide crosslinked using diisocyanates, dicarboxylic acids, formaldehyde and/or diglycidyl ethers, polyetherurethanes and/or alkylbenzenesulphonic acid salts.

Suitable polymers of ethylene oxide and/or 1,2-propylene oxide can be obtained, for example, by polyalkoxylation of lower alcohols, such as methanol, ethanol, propanols, butanols, pentanols or hexanols, using ethylene oxide and/or 1,2-propylene oxide. Alcohols which are also useful here are diols and polyols, for example propanediols, butanediols, neopentyl glycol, other pentanediols, hexanediols, cyclohexanediols, 1,4-bis(hydroxymethyl)cyclohexane, perhydroxybisphenol A, glycerol, 2-hydroxymethyl-2-methyl-1,2-propanediol, 2-ethyl-2-hydroxymethyl-1,2-propanediol, other hexanetriols and pentaerythritol. Lower amines, for example ethylenediamine and diethylenetriamine, can also be polyalkoxylated using ethylene oxide and/or 1,2-propylene oxide in order to obtain suitable polymers. Not only block copolymers but also polymers having a statistical distribution of different hydroxyalkyl groups, so-called random copolymers, or mixed forms of these two forms can be used. Preference is given to block copolymers of ethylene oxide and 1,2-propylene oxide and those products in which alcohols are first reacted with a mixture of propylene oxide and 70 to 90% by weight of the total amount of the ethylene oxide to give random copolymers and the remaining 10 to 30% by weight of the ethylene oxide is introduced hereupon, so that a polyether is formed which contains virtually only primary OH end groups. Preference is given to polymers of ethylene and 1,2-propylene oxide which contain 40 to 60% by weight of ethylene oxide, based on the total ethylene oxide +1,2-propylene oxide. Particularly preferred polyethers are built up from the same amounts by weight of ethylene oxide and 1,2-propylene oxide. In addition, polyethers having molecular weights from 600 to 6000 are preferred, those having molecular weights from 1000 to 5000 are particularly preferred.

Suitable alkoxylated phenol resins can be obtained, for example, by condensation of alkylphenols with formaldehyde, formalin solution or paraformaldehyde and subsequent alkoxylation.

Suitable block or random copolymers of ethylene oxide and/or 1,2-propylene oxide crosslinked using diisocyanate, dicarboxylic acids, formaldehyde and/or diglycidyl ethers can be obtained, for example, if a bifunctional polyether, for example composed of 30 to 90% by weight of 1,2-propylene oxide and 70 to 10% by weight of ethylene oxide, having a mean molecular weight from 2000 to 20,000, is reacted with a bifunctional diisocyanate, a bifunctional carboxylic acid, formaldehyde and/or a bifunctional diglycidyl ether. Examples of suitable diisocyanates are hexamethylene diisocyanate, 1,4-cyclohexylene diisocyanate, 2,4- and 2,6-propylene diisocyanate and mixtures thereof, 1-isocyanatomethyl-5-isocyanato-1,3,3-trimethylcyclohexane, 2,2,4- and 2,4,4-trimethyl-1,6-hexamethylene diisocyanate, 1,5-naphthalene diisocyanate, 1,3-cyclopentylene diisocyanate, m- and p-phenylene diisocyanate, 1,3- and 1,4-xylylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, durene diisocyanate, 1-phenoxy-2,4'-phenylene diisocyanate, 1-tert-butyl-2,4-phenylene diisocyanate, methylene-4,4'-bis-(isocyanatocyclohexyl), 1-chloro-2,4-phenylene diisocyanate and bis(4-isocyanatophenyl) ether. Examples of suitable bisglycidyl ethers are those of bisphenol A, and reaction products of epichlorohydrin and aniline and reaction products of perhydrophthalic acid with epichlorohydrin. Examples of suitable difunctional carboxylic acids are oxalic acid, malonic acid, succinic acid, glutaric acid, adipic acid, pimelic acid, suberic acid, maleic acid, fumaric acid and higher saturated or unsaturated dicarboxylic acids.

Suitable crosslinked block or random copolymers of ethylene oxide and/or 1,2-propylene oxide are, for example, linked and amine-modified polyalkylene oxides of the general formula (I)

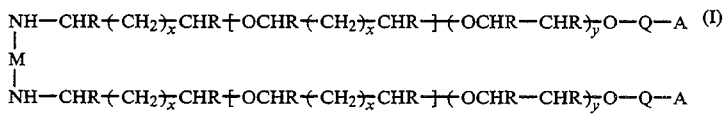

in which
each R, independently of each other, denotes hydrogen or a $C_1$–$C_{20}$-alkyl radical,
each x, independently of each other, denotes zero or an integer from 1 to 12,
each y, independently of each other, denotes zero or an integer from 1 to 120,
each Q, independently of each other, denotes a $C_6$–$C_{18}$-arylene, $C_7$–$C_{18}$-aralkylene or $C_2$–$C_{18}$-alkylene group,
each A, independently of each other, denotes hydrogen, hydroxyl or a radical of the formula (II)

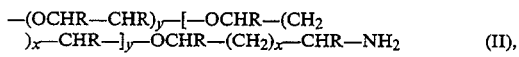

with
R, x and y denoted as described above and
M denotes the radical of a diisocyanate, a bisepoxide, a dicarboxylic acid, a dihalide of a dicarboxylic acid, a biscarboxylic anhydride, a diester or a dihalogeno compound, after the two respective reactive groups have reacted with an aminehydrogen atom.

Preferred crosslinked block and/or random copolymers of ethylene oxide and/or 1,2-propylene oxide can be obtained by reacting monofunctional polymers of ethylene oxide and/or 1,2-propylene oxide with diisocyanates, bisglycidyl ethers or dicarboxylic acids, for example those described above, and then reacting the product with a polyalkylenepolyamine.

Suitable polyetherurethanes for the process according to the invention are, for example, urea-modified polyetherurethanes of the formula (III)

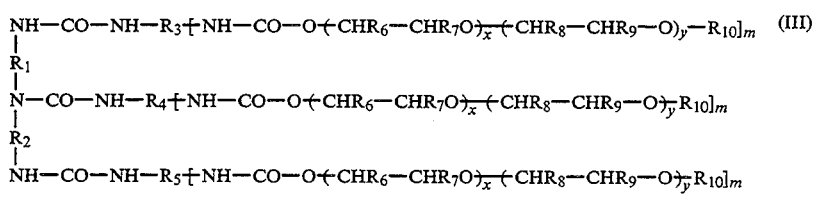

in which
$R_1$ and $R_2$, independently of each other, denote $C_2$–$C_{14}$-cycloalkylene,
$R_3$, $R_4$ and $R_5$, independently of each other, denote unsubstituted or substituted alkylene, cycloalkylene or arylene,
$R_6$, $R_7$, $R_8$ and $R_9$, independently of each other, denote hydrogen or $C_1$–$C_{20}$-alkyl,
$R_{10}$ denotes $C_1$–$C_{18}$-alkyl, $C_6$–$C_{18}$-aryl, $C_7$–$C_{18}$-aralkyl or $C_2$–$C_{18}$-alkenyl and
n represents the numbers 0 to 50,
m represents the numbers 1 to 4,
x represents the numbers 5 to 100 and
y represents the numbers 0 to 100.

Preferred polyetherurethanes are formed by reaction of polymers of ethylene oxide and/or 1,2-propylene oxide, which were obtained as described above, with a bifunctional isocyanate, as is described above for the preparation of crosslinked block or random copolymers, and a polyalkylenepolyamine.

Polyurea-modified polyether polyurethanes can also be used which were prepared, for example, from ethylenediamine, diethylenetriamine, triethylenetetramine, 3-ethylenepentamine, pentaethylenehexamine, polyethyleneimine, 1,2- and 1,3-propylenediamine, dipropylenetetramine, butylenediamine, hexamethylenediamine, 2,5-diamino-2,5-dimethylhexane, 2,2,4- and 2,4,4-trimethyl-1,6-hexanediamine, cyclohexanediamine, isophoronediamine, hydrogenated polyalkylenediamines and hydrogenated diaminodiphenylmethanes.

Trifunctional and higher functional polyamines are preferred here. Diethylenetriamine, triethylenetetramine, tetraethylenepentamine and pentaethylenehexamine are particularly preferred.

Industrial distillation residues from the preparation of the oligoethyleneamines mentioned are also highly suitable for the preparation of polyurea-modified polyurethanes. These residues then additionally contain branched and/or cyclic polyalkylenepolyamines.

Suitable alkylbenzenesulphonic acid salts are, for example, salts of alkylbenzenesulphonic acids and alkylnaphthalenesulphonic acids. Salts of dodecylsulphonic acid are particularly preferred.

In the process according to the invention, a water phase, which is suitable as utility water or which can be discharged in an outfall, is obtained from the micro-, nano- and/or ultrafiltration or reverse osmosis and an oil phase (from stage d)) is obtained, which generally contains only little water and which can be disposed of or recycled without problems. The reprocessing according to the invention of oil-in-water emulsions is thus markedly better and more effective than the processes of the prior art.

In a preferred embodiment of the process according to the invention, in stage a), 50 to 1000 ppm, preferably 100 to 500 ppm, of an organic cationic emulsion breaker are added to the oil-in-water emulsion to be treated and, if required, 50 to 1000 ppm, preferably 100 to 500 ppm, of an inorganic emulsion breaker are then added. After a creaming time of, for example, 1 to 4 hours, a highly oil-rich oil scum layer can then be separated off at the top from the water phase.

Stage d) of the process according to the invention is carried out in a particular embodiment in such a manner that a mixture of a 2-component emulsion breaker is used in an amount of 5 to 18,000 ppm, preferably 10 to 10,000 ppm. The first component is synthetic polymers based on acrylamide, polyamines, polyamidamines, quaternised polyamines, quaternised polyamidamines and dimethyldiallylammonium chloride and the second component is polymers and/or oligomers of ethylene oxide and/or 1,2-propylene oxide, alkoxylated phenol resins, block or random copolymers of ethylene oxide or 1,2-propylene oxide crosslinked using diisocyanates, dicarboxylic acids, formaldehyde and/or diglycidyl ethers, polyetherurethanes and/or alkylbenzenesulphonic acid salts. The relative amount of the first component to the second component in this case can be, for example, in the range from: 10 to 90% by weight (based on the total emulsion breaker).

Stage d) of the process according to the invention can be carried out, for example, at temperatures in the range from 0° to 100° C. This temperature is preferably 10° to 80° C.

In stage d) of the process according to the invention, the procedure can also frequently be successfully carried out using only one of the emulsion breaker components mentioned.

EXAMPLES

Example 1

An oil-in-water emulsion from a motor works which contained 28,500 ppm of hydrocarbons and had a chemical oxygen demand (COD) of 115,000 ppm received an addition of 100 ppm of polyamideamine. After 3 hours at 22° C., an oil phase was separated off which still contained 54% by weight of water. A water phase remained which had a residual content of hydrocarbons of 52 ppm and a COD of 9550 ppm. The water phase was fed to a membrane filtration in which an oil phase was obtained as retentate which still contained 72% by weight of water and a water phase was obtained which only contained 3 ppm of hydrocarbons and had a COD of 7830 ppm. The water phase can be used as utility water or discharged into an outfall. The oil phase from the breaking of the starting emulsion and the oil phase from the membrane filtration were combined and fed to a so-called hybrid breakdown using 8000 ppm of emulsion breaker, comprising 3000 ppm of a polyamideamine and 500 ppm of an alkoxylated nonylphenol-formaldehyde resin. After 12 hours at 60° C., an oil phase was obtained which only contained 0.5% by weight of water and could thus be disposed of without problems, and a water phase was obtained which contained 160 ppm of hydrocarbons and had a COD of 35,000 ppm. This water phase was recycled into the primary breaking.

Example 2

An oil-in-water emulsion from an electrical machinery production factory which contained 3180 ppm of hydrocarbons and had a chemical oxygen demand (COD) of 30,410 ppm received an addition of 400 ppm of a polyamideamine composition. After 3 hours at 20° C., an oil phase was separated off which still contained 48% by weight of water. A water phase remained which had a residual content of hydrocarbons of 44 ppm and a COD of 2480 ppm. The water phase was fed to a membrane filtration in which an oil phase was obtained as retentate which still contained 78% by weight of water and a water phase was obtained which only contained 2 ppm of hydrocarbons and had a COD of 1720 ppm. The water phase can be used as utility water or discharged into an outfall. The oil phase from the breaking of the starting emulsion and the oil phase from the membrane filtration were combined and fed to a so-called hybrid breakdown using 4500 ppm of emulsion breaker, comprising 2000 ppm of a polyamideamine composition and 2500 ppm of a polyetherpolyol composition. After 24 hours at 50° C., an oil phase was obtained which only contained 0.8% by weight of water and could thus be disposed of without problems, and a water phase was obtained which contained 82 ppm of hydrocarbons and had a COD of 16,700 ppm. This water phase was recycled into the primary breaking.

Example 3

An oil-in-water emulsion from a car factory which contained 830 ppm of hydrocarbons and had a chemical oxygen demand (COD) of 3800 ppm received an addition of 80 ppm of a polyamine salt. After 1 hour at 20° C., an oil phase was separated off which still contained 37% by weight of water. A water phase remained which had a residual content of hydrocarbons of 42 ppm and a COD of 1390 ppm. The water phase was fed to a membrane filtration in which an oil phase was obtained as retentate which still contained 68% by weight of water and a water phase was obtained which only contained 2 ppm of hydrocarbons and had a COD of 980 ppm. The water phase can be used as utility water or discharged into an outfall. The oil phase from the breaking of the starting emulsion and the oil phase from the membrane filtration were combined and fed to a so-called hybrid breakdown using 5000 ppm of emulsion breaker, comprising 1000 ppm of a polyamine composition and 4000 ppm of a urea-modified polyether. After 6 hours at 70° C., an oil phase was obtained which only contained 0.4% by weight of water and could thus be disposed of without problems, and a water phase was obtained which contained 98 ppm of hydrocarbons and had a COD of 5700 ppm. This water phase was recycled into the primary breaking.

What is claimed is:

1. A process for reprocessing oil-in-water emulsions, in which
    a) an oil-in-water emulsion is first subjected with the aid of a chemical emulsion breaker to a first breaking, resulting in a water phase and an oil phase,
    b) the resulting water phase is fed to one or more of micro-, nano- and ultrafiltration and reverse osmosis, resulting in an oil phase retentate,
    c) the oil phase from the first breaking is combined with the oil phase retentate resulting from stage b) and
    d) the oil phases thus combined are subjected with the aid of a 2-component organic emulsion breaker to a second breaking, resulting in a water phase and an oil phase.

2. The process of claim 1, wherein said 2-component organic emulsion breaker is a 2-component emulsion breaker in which the first component comprises a member of the group consisting of a synthetic polymer based on acrylamide, a synthetic polymer based on polyamines and/or polyamideamines, quaternised polyamines, quaternised polyamideamines and homopolymers of dimethyldiallylammonium chloride and the second component comprises a member of the group consisting of polymers and/or oligomers of ethylene oxide and/or 1,2-propylene oxide, alkoxylated phenol resins, block or random copolymers of ethylene oxide and 1,2-propylene oxide crosslinked using diisocyanates, dicarboxylic acids, formaldehyde and/or diglycidyl ethers, polyurethanes and alkylbenzenesulphonic acid salts.

3. The process of claim 2, in which the relative amount of the first component to the second component is in the range from 10 to 90% by weight based on the total emulsion breaker.

4. The process of claim 1, in which in stage a) 5 to 1000 ppm of an organic cationic emulsion breaker are added to the oil-in-water emulsion to be treated.

5. The process of claim 1, in which in stage d) 5 to 18,000 ppm of a 2-component emulsion breaker are used.

6. The process of claim 1, in which stage d) is carried out at temperatures in the range from 0° to 100° C.

* * * * *